(12) United States Patent
Dragon

(10) Patent No.: US 10,832,732 B2
(45) Date of Patent: Nov. 10, 2020

(54) TELEVISION BROADCAST SYSTEM FOR GENERATING AUGMENTED IMAGES

(71) Applicant: uniqFEED AG, Opfikon-Glattbrugg (CH)

(72) Inventor: Ralf Dragon, Hannover (DE)

(73) Assignee: UNIQFEED AG, Zurich (CH)

( * ) Notice: Subject to any disclaimer, the term of this patent is extended or adjusted under 35 U.S.C. 154(b) by 0 days.

(21) Appl. No.: 16/341,645

(22) PCT Filed: Oct. 9, 2017

(86) PCT No.: PCT/EP2017/075623
§ 371 (c)(1),
(2) Date: Apr. 12, 2019

(87) PCT Pub. No.: WO2018/069218
PCT Pub. Date: Apr. 19, 2018

(65) Prior Publication Data
US 2019/0371363 A1    Dec. 5, 2019

(30) Foreign Application Priority Data

Oct. 14, 2016  (DE) ......................... 10 2016 119 637

(51) Int. Cl.
*G11B 27/031*     (2006.01)
*G11B 27/10*      (2006.01)
(Continued)

(52) U.S. Cl.
CPC ............ *G11B 27/031* (2013.01); *G11B 27/10* (2013.01); *H04N 5/272* (2013.01); *H04N 5/77* (2013.01);
(Continued)

(58) Field of Classification Search
None
See application file for complete search history.

(56) References Cited

U.S. PATENT DOCUMENTS

| 5,731,846 | A  | 3/1998 | Kreitman et al. |
| 6,292,227 | B1 | 9/2001 | Wilf et al. |

(Continued)

FOREIGN PATENT DOCUMENTS

| DE | 102004011629 A1 | 10/2004 |
| EP | 0683961 A1 | 11/1995 |

(Continued)

OTHER PUBLICATIONS

"Location Android Developer", https://web.archive.org/web/20140701065849/http://developer.android.com/reference/android/location/Location.html, Aug. 5, 2015, pp. 1-8.
(Continued)

*Primary Examiner* — James R Marandi
(74) *Attorney, Agent, or Firm* — Murphy, Bilak & Homiller, PLLC

(57) ABSTRACT

The invention relates to a television broadcast system comprising a number of television cameras (C1, C2); at least one production unit (12) which is configured to generate a series of production images from the camera images of the number of television cameras (C1, C2) and to issue said images as production signals (S3); a number of analysis modules (A1, A2) which are configured to analyse each individual camera image, to calculate camera-image metadata (M) and an associated camera-image hash value (H) for each camera image and to issue the camera-image metadata (M) and the camera-image hash value (H) for each camera image asynchronously; a synchronisation module (14) connected to the production unit (12) and the analysis modules (A1, A2) and configured to receive the production images from the production unit (12) as synchronously buffered images and to calculate, for each production image, an associated production image hash value (HR). The synchronisation module (14) is also configured to compare production image hash
(Continued)

values (RH) and camera image hash values (H), to assign, on the basis of this comparison, the associated camera-image metadata (Mj) of a camera image as production-image metadata (MR) to a current production image (Ri), and to issue the production-image metadata (MR) as synchronously buffered images; a multiplication module (16) connected to the synchronisation module (14) and the production unit (12) and configured to receive the production-image metadata (MR) from the synchronisation module (14) as synchronously buffered images and to receive the production images from the production unit (12) as synchronously buffered images, the multiplication module also being configured: to compensate a time difference between a production image and the associated production-image metadata (MR); to change in the production image, on the basis of the production-image metadata (MR), at least one portion of the production image by means of an augmentation, thus producing an augmented production image; and to issue the augmented production image.

18 Claims, 6 Drawing Sheets

(51) Int. Cl.

| | | |
|---|---|---|
| *H04N 5/272* | (2006.01) | |
| *H04N 5/77* | (2006.01) | |
| *H04N 21/234* | (2011.01) | |
| *H04N 21/488* | (2011.01) | |
| *H04N 21/81* | (2011.01) | |
| *H04N 21/426* | (2011.01) | |
| *H04N 5/445* | (2011.01) | |
| *H04N 21/435* | (2011.01) | |

(52) U.S. Cl.
CPC ... *H04N 21/23418* (2013.01); *H04N 21/4886* (2013.01); *H04N 21/812* (2013.01); *H04N 5/445* (2013.01); *H04N 21/42653* (2013.01); *H04N 21/4355* (2013.01); *H04N 21/814* (2013.01); *H04N 21/8146* (2013.01)

(56) References Cited

U.S. PATENT DOCUMENTS

| | | |
|---|---|---|
| 6,384,871 B1 | 5/2002 | Wilf et al. |
| 7,158,666 B2 | 1/2007 | Deshpande et al. |
| 9,892,538 B1 | 2/2018 | Balasubramanian et al. |
| 2003/0001954 A1 | 1/2003 | Rantalainen et al. |
| 2004/0085342 A1 | 5/2004 | Williams et al. |
| 2006/0026628 A1 | 2/2006 | Wan et al. |
| 2010/0182447 A1 | 7/2010 | Mizuno et al. |
| 2010/0277468 A1 | 11/2010 | Lefevre et al. |
| 2012/0033032 A1 | 2/2012 | Kankainen |
| 2013/0050294 A1 | 2/2013 | Hubo |
| 2013/0249900 A1 | 9/2013 | Lee et al. |
| 2015/0007218 A1 | 1/2015 | Neumann et al. |
| 2015/0163416 A1 | 6/2015 | Nevatie |
| 2015/0206349 A1 | 7/2015 | Rosenthal et al. |
| 2016/0028968 A1 | 1/2016 | Affaticati |
| 2016/0217604 A1 | 7/2016 | De Roos et al. |
| 2016/0226253 A1 | 8/2016 | Abido et al. |
| 2016/0227275 A1 | 8/2016 | Vuori |
| 2016/0373814 A1 | 12/2016 | Kellner |
| 2017/0237910 A1 | 8/2017 | Salin et al. |

FOREIGN PATENT DOCUMENTS

| | | |
|---|---|---|
| EP | 1071278 A2 | 1/2001 |
| EP | 2463821 A1 | 6/2012 |
| EP | 2498489 A1 | 9/2012 |
| EP | 2822288 A1 | 1/2015 |
| FR | 2959339 A1 | 10/2011 |
| GB | 2408164 A | 5/2005 |
| JP | 2006180074 A | 7/2006 |
| JP | 2009239459 A | 10/2009 |
| JP | 2015204512 A | 11/2015 |
| KR | 20130022491 A | 3/2013 |
| KR | 20130115332 A | 10/2013 |
| WO | 9631047 A2 | 10/1996 |
| WO | 9712480 A2 | 4/1997 |
| WO | 2014031899 A1 | 2/2014 |

OTHER PUBLICATIONS

Abawi, Daniel F, et al., "Accuracy in Optical Tracking with Fiducial Markers: An Accuracy Function for ARToolKit", Proceedings of the Third IEEE and ACM International Symposium on Mixed and Augmented Reality (ISMAR 2004), 2004, pp. 1-2.

Hallaway, Drexel, et al., "Bridging the Gaps: Hybrid Tracking for Adaptive Mobile Augmented Reality", Applied Artificial Intelligence; vol. 18, No. 6, Jul. 1, 2004, pp. 477-500.

Jain, Ramesh, et al., "Metadata in Video Databases", ACM SIGMOD Record., vol. 23, No. 4, Dec. 1994, pp. 27-33.

Lindner, Manfred, "Content Management—technische Aufbereitung, Transport und Präsentation von Daten", Elektrotechnik und Informationstechnik. Heft 7/8, Jul./Aug. 2003, pp. 245-250.

Lu, Boun Vinh, et al., "Foreground and Shadow Occlusion Handling for Outdoor Augmented Reality", 9th IEEE International Symposium, 2010, pp. 109-118.

Paulevé, Loic, et al., "Locality sensitive hashing: A comparison of hash function types and querying mechanisms", Pattern Recognition Letters, Bd. 31, H. 11, 2010, pp. 1348-1358.

Segal, Mark, et al., "The OpenGL Graphics System: A Specification (Version 1.2.1)", Silicon Graphics, Inc., Oct. 14, 1998, pp. 1-278.

Shepard, Daniel P., et al., "Precise Augmented Reality Enabled by Carrier-Phase Differentiated GPS", 25th International Technical Meeting of the Satellite Division of the Institute of Navigation, Nashville, TN, Sep. 17-12, 2012, pp. 3169-3184.

Sun, Jiande, et al., "Unequally Weighted Video Hashing for Copy Detection", Advances in Multimedia Modeling; 19th International Conference, MMM; Huangshan, China, Jan. 7-9, 2013, pp. 546-557.

Weng, Li, et al., "From Image Hashing to Video Hashing", Advances in Multimedia Modeling; 16th International Conference, MMM, Chongqing, China, 2010, pp. 662-668.

Xu, Changsheng, et al., "Implanting Virtual Advertisement into Broadcast Soccer Video", Pacific-Rim Conference on Multimedia, 2004, LNCS 3332; Springer-Verlag Berlin Heidelberg, 2004, pp. 264-271.

TELEVISION BROADCAST SYSTEM FOR GENERATING AUGMENTED IMAGES

The invention relates to a television broadcast system, comprising a plurality of television cameras, which are configured to record camera images and output them as camera signals, and a production unit, which is configured to generate a sequence of production images from the camera images of the plurality of television cameras and output them as production signals.

Such television broadcast systems are sufficiently known and are used both for live broadcasts and for post-productions. In the case of post-productions, the camera images usually originate from at least one storage medium, such as a hard disk or the like, on which the image sequences previously recorded by means of the cameras have been stored.

It is known to perform fading in or superimposition in such television broadcast systems. In this process, sensor data are recorded by additional sensors, such as by acceleration sensors, compass, gyrocompass or distance meter, in addition to the camera images generated by the cameras in order to have additional information about the orientation of a camera in space, so that objects displayed in the camera image are identified and can be superimposed, when required. In this connection, it is also known to use additional cameras, which do not serve to record television images, but the image contents of which can be used to be able to provide additional image information on the television image.

Object of the invention is to provide a television broadcast system, which enables the fading in or superimposition of subsections of a recorded camera image without additional sensors.

Therefore, a television broadcast system is suggested, comprising:
  a plurality of television cameras, which are configured to record camera images and output them as camera signals;
  at least one production unit, which is configured to generate a sequence of production images from the camera images of the plurality of television cameras and output them as production signals;
  a plurality of analysis modules, wherein an analysis module is assigned to each television camera, wherein the analysis modules are configured to receive the camera images synchronously buffered, and wherein the analysis modules are configured to analyze each individual camera image and calculate camera image metadata as well as an associated camera image hash value for each camera image and asynchronously output the camera image metadata and the camera image hash value for each camera image;
  a synchronization module connected to the production unit and to the analysis modules and configured to receive the production images from the production unit synchronously buffered and calculate, for each production image, an associated production image hash value, as well as receive, for each camera image, the camera image metadata and the associated camera image hash value from the analysis modules asynchronously buffered, wherein the synchronization module is further configured to compare production image hash values and camera image hash values, and assign, based on this comparison, the associated camera image metadata of a camera image to a current production image as production image metadata and output the production image metadata synchronously buffered;
  a multiplication module connected to the synchronization module and to the production unit and configured to receive the production image metadata from the synchronization module synchronously buffered and receive the production images from the production unit synchronously buffered, wherein the multiplication module is further configured to compensate for a time offset between a production image and the associated production image metadata, and wherein the multiplication module is further configured to generate, based on the production image metadata, a change in the production image of at least one subsection of the production image by means of an augmentation, so that an augmented production image is generated, and output the augmented production image.

The term "production unit" used herein represents, in particular, the process of image selection and image editing, which is performed inside a production van on site, for example. The term also comprises a plurality of production units connected to one another, which each work independently, such as in television networks where the output of a direction unit passes on information to a hierarchically higher production unit. This is, for example, the case for sport events where different matches are separately produced each with a plurality of cameras.

The term "augmentation" used herein is meant to designate a kind of enhancement or change of the reproduction of reality, for example, the superimposition of an advertising message written in the English language in reality on a banner of a sports field with an identical or other advert in another language, such as the language of the target country in which the television broadcast can be seen. However, a superimposition is not the only possibility of changing or augmenting a production image. Rather, by augmentation within the scope of the present invention can be understood that the production image itself is changed locally. The German term "Anreicherung" used herein is also known as "Augmentierung" in the technical jargon, which is oriented on the English term "augment" which means improve, enhance, enrich.

The television broadcast system presented herein only works with camera images. A use of additional sensors is not required. Furthermore, the system presented herein is capable of augmenting arbitrary areas or subsections with other image information, and in this process does not require any adjustment or restriction of the real recorded scene, such as certain background colors (so-called chroma keying) or the use of self-luminous backgrounds, such as LED panels, infrared reflecting objects or the similar. The selection of an augmentation of a production image to be broadcast emerges from the comparison of the production image hash value to the camera image hash values. If both hash values are identical, it can be derived therefrom that the current production image corresponds to a camera image recorded by a specific camera. Via the associated camera image metadata where structured information about the actual image contents, such as in the case of a sports broadcast, sports field, banner, stand and the like, is included, an augmentation or superimposition can be determined for a subsection of the production image. If, for example, it can be derived from the metadata in which section a banner with advertising is located, this advertising section can be superimposed by an augmentation, for example, with another advertising.

It is pointed out that the television broadcast system can alternatively be used for a post-production. Instead of the television cameras which record the images live and transmit them to the analysis modules, there is then at least one storage medium on which camera images of a television broadcast have been stored. These stored camera images are then used instead of the live recorded camera images. Also in this case an analysis module can be assigned to each camera, the camera images of which have been stored on the storage medium, in order to be able to enable the augmentations in a post-production as well. The production unit is also available in a post-production, wherein it then can also be designated as a post-production unit.

The television broadcast system can further comprise a control module connected to the production unit, to the analysis modules, to the synchronization module and to the multiplication module, wherein the control module is configured to enable or disable the analysis modules, the synchronization module and the multiplication module based on a control signal transmitted from the production unit to the control module. Therefore, the control module serves to centrally control the additional components of the television broadcast system to a known system. For the simple integration of such a system expansion, it is advantageous that the control module can be controlled by the production unit.

The control module can be further configured to monitor or control the time offset between a production image and the associated production image metadata and send the time offset to the multiplication module. Since the production image is not subjected to an analysis by the analysis module, the image signals of a production image are in general earlier available than the associated production image metadata, which are generated on the basis of the camera image metadata to be created for each camera image and are assigned, based on the above-described hash value comparison between a current production image and camera images, to a current production image.

The control module can be further configured to store at least one given augmentation and transmit the augmentation to the multiplication module. Such an augmentation can, for example, be available in the form of an image file, of a video sequence or the like. Conceivable is also a text sequence, which, taking into account additional parameters, can be graphically represented in an arbitrary manner as augmentation or fading in/superimposition in an augmented production image.

The control module can be further configured to store at least one given animation sequence and send the animation sequence to the multiplication module. Such an animation sequence serves to avoid an abrupt change in a production image when one is to proceed from a production image to an augmented production image. A possible animation sequence can, for example, be that a successive change of the production image occurs via a sequence of a certain number of production images, e.g. by local change or augmentation of the production image, or, for example, by fading in the augmentation, and that the real content in this image section is successively changed in such a manner that only the augmentation is visible or the original production image section is faded out. By means of such an animation sequence, for example, a virtual rolling banner can be realized, e.g. rolling upwards or downwards or sidewards. Furthermore, it is conceivable to provide a kind of virtual window where the real content is flipped open, and the augmentation appears in the flipped open section.

The multiplication module can be further configured to transmit, in a first state, the augmented production image, transmit, in a second state, the production image, perform, in a third state, the transition from the second state to the first state by means of an animation sequence, and perform, in a fourth state, the transition from the first state to the second state by means of an animation sequence. In this process, the first state can also be described as a state, in which usually the production image is augmented, and augmented production images are broadcast. The second state can also be described as a state, in which the production image is broadcast without augmentation, i.e. passes through the multiplication module or is directed past it unchanged. The third and fourth states are transition states, in which the above-mentioned animation sequences, such as rolling banners or the like, take place, to continuously allow enabling or disabling an augmentation of the production images.

The multiplication module can have at least one augmentation component, which is configured to generate the augmented production image based on the first to fourth states, on the production image metadata, on the augmentation transmitted by the control module and on the animation sequence transmitted by the control module. Usually, the multiplication module has a plurality of augmentation components, with each augmentation component generating a different augmentation for the same production image. For example, in the case of a worldwide television broadcast, there could be an augmentation component for each country into which the television signal is to be broadcast, so that, by means of the augmentation component, a specific augmentation, for example, perimeter advertising adjusted in terms of language and contents, can be faded in for each country.

The control module can have at least one further data input, which is configured to receive additional data from a further camera and/or from a screen system, in particular, LED system, and/or from a video storage system, wherein the control module is configured to transmit the additional data to the multiplication module, wherein the multiplication module is configured to take into account the additional data for the generation of the augmented production image.

The television broadcast system can further comprise an electronic banner system with an image signal output, which is connected to a plurality of banner monitors and configured to display and/or animate banner images on the plurality of banner monitors, wherein the banner system is connected to the control module and configured to transmit a banner image signal for the banner monitors to the control module. In this process, the analysis modules can be configured to determine occlusions, in particular, occlusions of a banner monitor based on a comparison between the banner image signals and a camera image. In an example, the image, which is currently displayed by the LEDs, can, for example, be recorded with one or more HDMI or DVI signals at a monitor output of an LED system (perimeter advertising). The LED system can be radiometrically calibrated with the aid of a calibration animation, which is recorded by each camera. A function of representation can thereby be determined, which is to be displayed on the LEDs for a specific color value in the original image, and can predict a specific other color value in the camera image recorded by it. Thereby occlusions of LEDs can be precisely determined by the analysis module, since the background to be expected is known at each point in time.

The multiplication module can also be configured to provide an augmented production image where an augmentation or superimposition in a specific image section is orthogonally projected for each camera setting. Here it is particularly considered that the augmentation has a specific geometry, which is orthogonally projected from the view of the camera. This is a kind of virtual "cam carpet", a pre-distorted pattern which is printed on a sheet, wherein the sheet is spread on the floor. In the case of an augmentation with a specific geometry, the pattern to be faded in need not be distorted, but can, depending on the camera alignment, be individually calculated and faded in in the augmented production image. Accordingly, in the usual field of a "cam carpet", for example, to the left and right of the goals on a football pitch, a pattern or an advertising display could in reality, i.e. in the stadium, be spread printed on a sheet, wherein the pattern is optimally readable for the spectators in the stadium. This for the spectators in the stadium readable pattern can, within the scope of the television broadcast, be superimposed by means of an augmentation, so that the same pattern or another pattern is, depending on the camera alignment, always optimally displayed in the augmented production image.

The multiplication unit can be further configured to provide, in an augmented production image, a partial change or superimposition of a recorded transparent object, such as a transparent pane or the like, in such a manner that an augmentation and/or an animation is visible on the transparent object in the augmented production image. In the case of such a change or superimposition of a transparent background, it is also considered that the augmentation or animation itself has transparent or semi-transparent sections, so that, for example, visually perceivable holes or openings can be contained in the augmentations. Such animations or augmentations can also have arbitrary contours if the sections not belonging to the contour or a filled-out surface can be displayed in a transparent manner. Here it is, for example, considered that a transparent acrylic glass enclosure of an ice hockey rink is used to be able to fade in patterns or advertising. Such a superimposition could, for example, also be taken into account for mobile interview walls. Such interview walls are usually printed or covered with the sponsors of the event. By means of the system presented herein, specific augmentations could be faded in within the area of these walls, for example, to take into account the sponsors of different teams, e.g. depending on the particular interview partner.

The multiplication module can be further configured to generate a plurality of diversely augmented production images and output them synchronously to different outputs. This enables, as already mentioned above, the output of diversely augmented production images, for example, depending on the countries into which the augmented production image is to be transmitted, or depending on whether the augmented production image is to be transmitted to a customer of pay TV or a customer of free TV.

The properties and features described above for the system can be phrased as a method as well. Accordingly, also the following method for the augmentation of images of a television broadcast or television recording is suggested, comprising the steps of:

recording camera images by means of a plurality of television cameras, and outputting the camera images as camera signals;

generating a sequence of production images generated from a selection from the camera images of the plurality of television cameras, and outputting the production images as production image signals;

synchronously buffered receiving of the camera images of the plurality of television cameras in a respective analysis module, wherein each camera image is analyzed and camera image metadata are generated for each camera image and a camera image hash value is calculated, and wherein the camera image metadata and the camera image hash value are asynchronously output from the respective analysis module;

synchronously buffered receiving of the production images in a synchronization module, calculating a production image hash value for each production image, and synchronously buffered receiving of the camera image metadata and of the associated camera image hash value for each camera image, wherein the production image hash values and camera image hash values are compared and, based on this comparison, the associated camera image metadata of a camera image are assigned to a current production image as production image metadata, and the production image metadata are output synchronously buffered;

synchronously buffered receiving of the production image metadata and of the production images in a multiplication module, compensating a time offset between a production image and the associated production image metadata in the multiplication module, and generating a superimposition in at least one subsection of the production image with an augmentation based on the production image metadata, so that an augmented production image is generated, and outputting the augmented production image.

According to a further independent aspect of the invention, a television broadcast system is suggested, comprising a plurality of television cameras, which are configured to record camera images and output them as camera signals, or at least one storage medium, which is configured to store camera images previously recorded by means of television cameras and output stored camera images as camera signals;

at least one production unit, which is configured to generate a sequence of production images from the camera images of the plurality of television cameras and output them as production signals;

a plurality of analysis modules, wherein an analysis module is assigned to each television camera, wherein the analysis modules are configured to receive the camera images synchronously buffered, and wherein the analysis modules are configured to analyze each individual camera image and calculate camera image metadata as well as an associated camera image hash value for each camera image and asynchronously output the camera image metadata and the camera image hash value for each camera image;

a synchronization module connected to the production unit and to the analysis modules and configured to receive the production images from the production unit synchronously buffered and calculate, for each production image, an associated production image hash value, as well as receive, for each camera image, the camera image metadata and the associated camera image hash value from the analysis modules asynchronously buffered, wherein the synchronization module is further configured to compare production image hash values and camera image hash values, and assign, based on this comparison, the associated camera image metadata of a camera image to a current production image as production image metadata and output the production image metadata synchronously buffered;

a multiplication module connected to the synchronization module and to the production unit and configured to receive the production image metadata from the synchronization module synchronously buffered and receive the production images from the production unit synchronously buffered, wherein the multiplication module is further configured to compensate for a time offset between a production image and the associated production image metadata, and wherein the multiplication module is further configured to generate, based on the production image metadata, a change in the production image of at least one subsection of the production image by means of an augmentation, so that an augmented production image is generated, and output the augmented production image, wherein the multiplication module is further configured to transmit, in a first state, the augmented production image, transmit, in a second state, the production image, perform, in a third state, the transition from the second state to the first state by means of an animation sequence, and perform, in a fourth state, the transition from the first state to the second state by means of an animation sequence.

In such a system, the multiplication module enables, by means of the mentioned states, arbitrary switching on/off of augmentations, wherein, due to the use of animation sequences, it is no longer visible for a user receiving the (augmented) production image, whether they see the actual production image, the permanently augmented production image or a transition image (during an animation sequence).

Thus, the switching on/off of the augmentation can occur elegantly and for a user or spectator unnoticed and also free of visual disruptive effects.

In the following text, the invention is exemplarily and non-restrictingly described with reference to the accompanying figures.

FIG. 1 shows a simplified schematic representation of the television broadcast system.

FIG. 2 schematically shows an analysis process.

FIG. 3 schematically shows a synchronization process.

FIG. 4 schematically shows a multiplication module and the associated multiplication process.

A television broadcast system 10 comprises a plurality of cameras C1, C2 and a production unit 12, wherein the cameras C1, C2 transmit their camera images as camera image signals to the production unit 12. Usually, more than two cameras C1, C2 belong to such a television broadcast system 10, which is indicated by the three black dots right of the camera C2.

In the present representation, data processed in a timed or synchronous manner or modules operated in a timed (synchronous) manner are displayed with solid lines. Asynchronously operated modules or asynchronously processed data are displayed as a dashed line. A customary processing path, which is sufficiently known, starts at the cameras C1, C2. The camera signals S1 are recorded by a plurality of cameras C1, C2 (to Cn) and transmitted to the production unit 12. Within the production unit 12, a production image sequence or a production image signal is compiled or edited from the camera images of the individual cameras C1 to Cn. The edited production image signal S3 or the consecutive production images, which is designated as world feed in the technical jargon, is broadcast. In this connection, it is pointed out that also in the case of a post-production, such as in the case of repetitions, slow motions, interviews or the like, the possibility is given to record or fade in augmentations, in particular, the same augmentations as in a previously live broadcast image. For this purpose, the production unit can be configured to enable or disable the augmentation by means of the control module for such post-productions during or after a live broadcast sequence.

Figure 1:
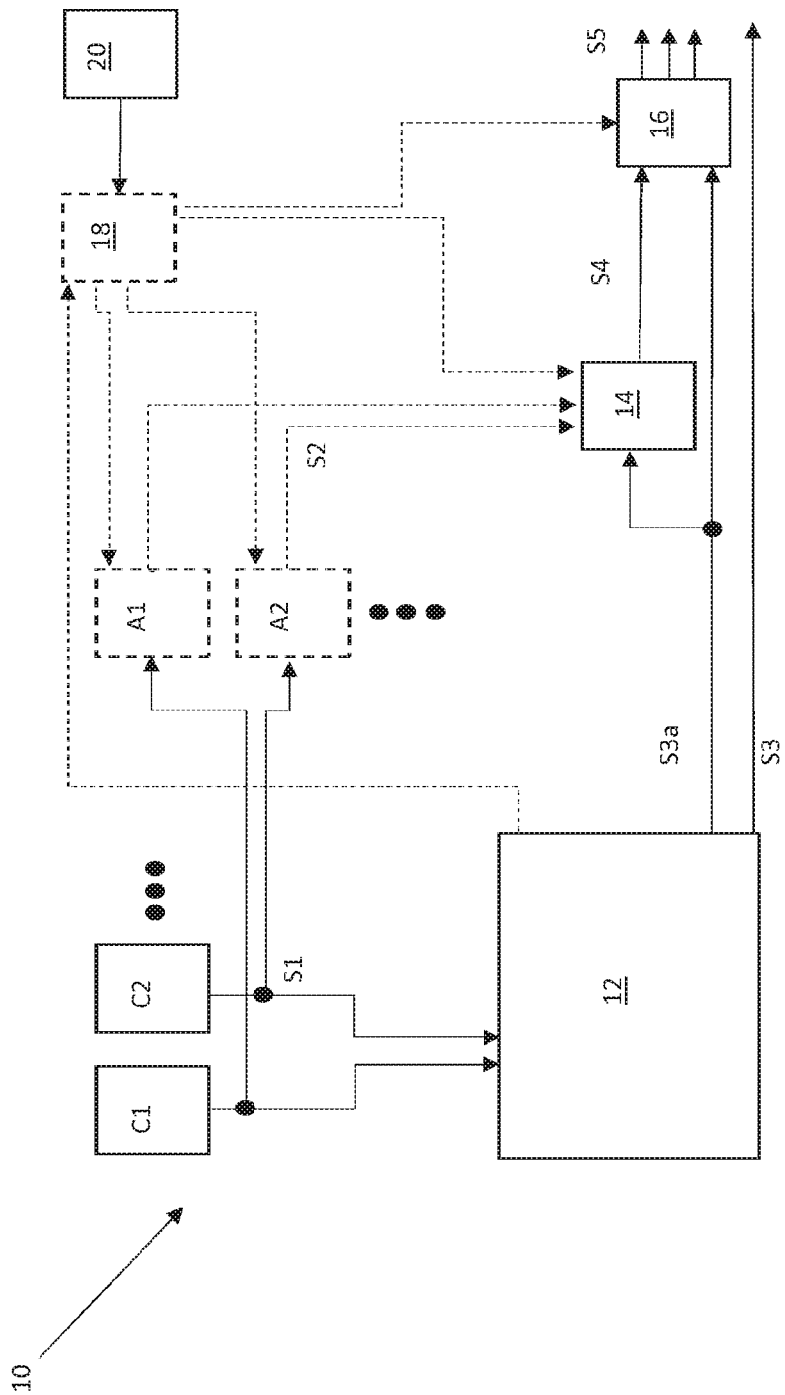

According to an embodiment of the present invention, the television broadcast system 10 is expanded as follows. Camera signals S1 are passed on to analysis modules A1, A2 (to An, indicated by three black dots below A2). The analysis modules A1, A2 pass the signals S2 on to a selection or synchronization module 14. An analysis module A1, A2 is assigned to each camera C1, C2. For each camera image, camera image metadata M1, M2 (to Mn) are generated by the analysis modules A1, A2 and an associated hash value H1, H2 (to Hn) calculated. A respective pair of the metadata and the hash value, i.e., for example, M1, H1 or M2, H2, are transmitted as signals S2 to the synchronization module 14 by the analysis modules A1, A2. The synchronization module 14 further receives the production image signal S3a or the production images from the production unit. The synchronization module 14 passes on revised metadata S4 of the camera currently visible in the production image to a multiplication module 16. The multiplication module 16 generates a plurality of augmented production image signals S5 which are broadcast. The analysis modules A1, A2, the synchronization module 14 and the multiplication module 16 are controlled by a control module 18. The control module 18 is controlled via the production unit 12. Furthermore, an optional LED system 20 is indicated in the representation of FIG. 1, which transfers image data, via an image transport protocol, for example, HDMI or DVI, to the control module 18. However, this LED system is not mandatory for the basic functioning of the television broadcast system 10.

Figure 2:
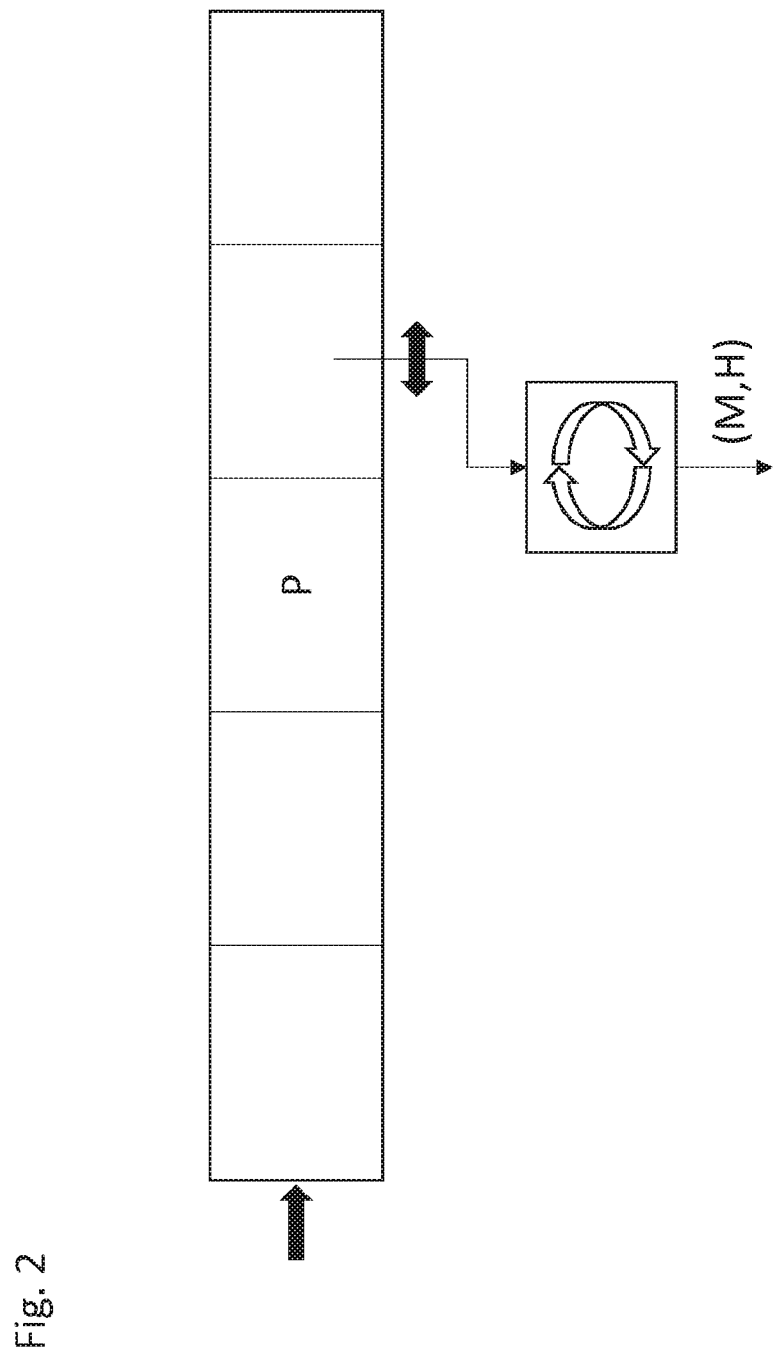

FIG. 2 exemplarily shows the process in an analysis module A1, A2. Synchronously buffered camera images or camera image signals are transferred, as input, to the analysis module A1, A2. The buffer where the camera images are stored temporarily is designated with P. For each camera image of a camera C1, C2, camera image metadata M and a camera image hash value H are determined or calculated in the associated analysis module A1, A2. These metadata M and the associated camera image hash value H are provided as output variables (output) by the respective analysis module A1, A2.

Thus, an analysis module A1, A2 receives, as input, timed camera images of a camera C1, C2, which are stored in a buffer P. The respective analysis module A1, A2 recognizes the position of objects to be superimposed, which are communicated by the control module 18. Additionally, occlusions of these objects by the foreground which is not to be superimposed are analyzed, e.g. by means of methods as they are described in "Boun Vinh Lu; Kakuta, T.; Kawakami, R.; Oishi, T.; Ikeuchi, K., "Foreground and shadow occlusion handling for outdoor augmented reality," Mixed and Augmented Reality (ISMAR), 2010 9th IEEE International Symposium on, vol., no., pp. 109,118, 13-16 Oct. 2010". For this purpose, current image processing methods are used (e.g. object recognition, object detection, convolutional neural networks), which asynchronously process image for image from the buffer P. The extracted metadata M are provided with a camera image hash value H, which is determined from the processed image content. This can, for example, be done by means of LSH, as this is described, for example, in "Lofc Pauleve, Herve Jegou, Laurent Amsaleg. Locality sensitive hashing: a comparison of hash function types and querying mechanisms. Pattern Recognition Letters, Elsevier, 2010, 31 (11), pp. 1348-1358". Naturally, also other calculation methods can be possible for the hash values, and the method mentioned is purely exemplary. The camera image hash values H are made robust through appropriate transformations with regard to partial occlusions and transformations. Thus, the extracted metadata M can later be assigned to an associated production image if the production 12 switches to the underlying camera C1, C2.

Figure 3:
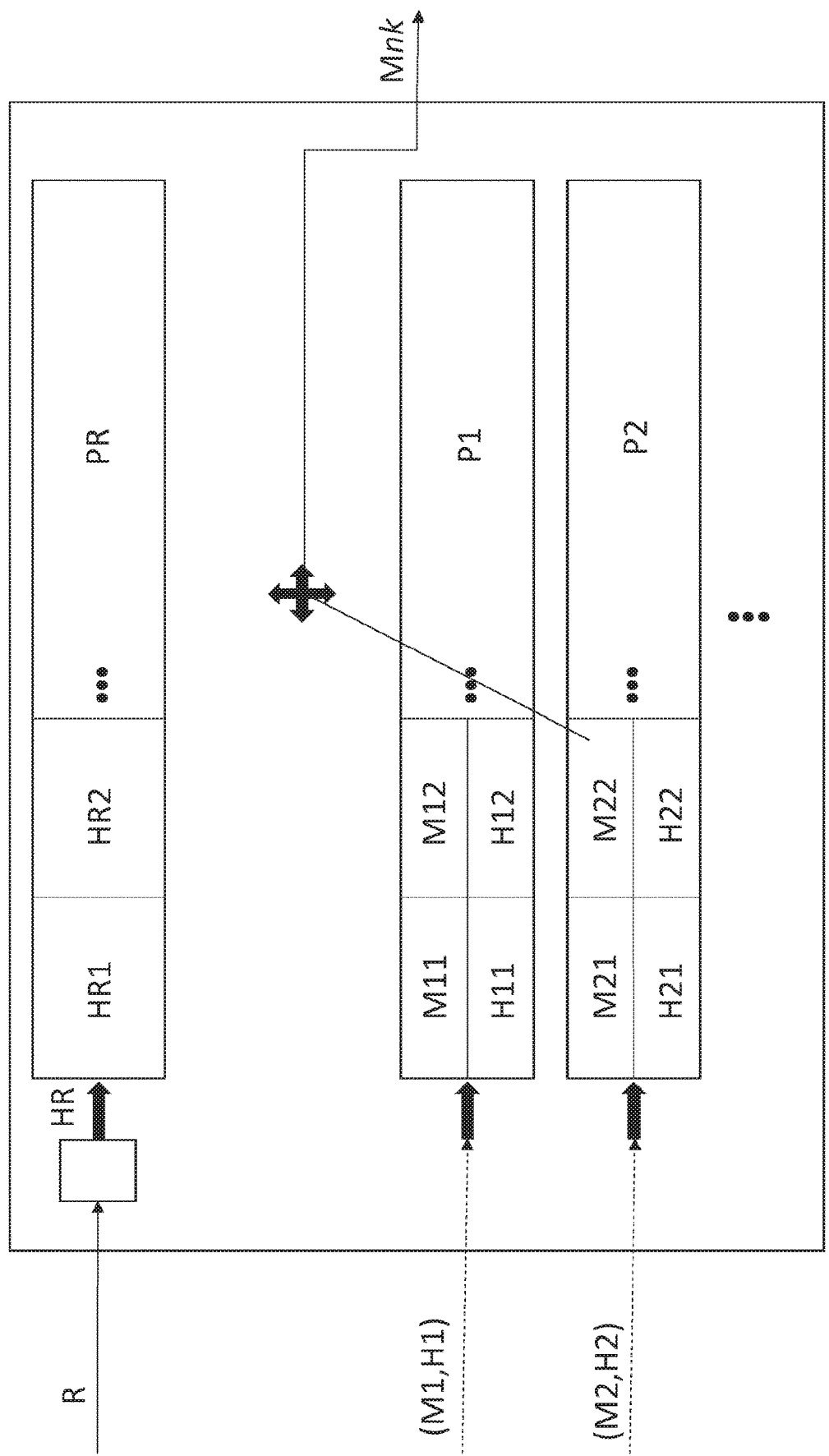

FIG. 3 schematically shows the synchronization module 14 and the associated process. The synchronization module 14 receives, as input variables (input), the synchronously buffered production images R or production image signals, in particular, via the signal path S3a (FIG. 1). Furthermore, the synchronization module 14 receives, for each camera image, the associated metadata M and the camera image hash value H as asynchronously buffered data from the respective analysis modules A1, A2 of all cameras C1, C2. The synchronization module 14 recognizes which image from which camera C1, C2 is displayed by the production unit 12. Furthermore, it is recognized how large the delay of the production is. For all production images R, a production image hash value HR is calculated at 22 in the same manner as in an analysis module A1, A2. For the recognition, the camera image hash values Hnk (n: camera, k: index in the buffer) of all datasets of the analysis image hash buffer Pn are compared to the production image hash values HR of all datasets HR1 in the production image hash buffer PR.

Those metadata Mnk are output as an output variable or output, which meet the following function:

$$\operatorname*{argmin}_{n,x} \frac{1}{|w(x)|} \sum_{l \in w(x), k=l-x} d(HRl, Hnk),$$

In this process, d is a suited metric for the comparison of hash values. Furthermore, w(x) designates the window displaced by x values, in which PR and Pn can be compared. l runs across all sampled values within the window and k analog across all sampled values of the displaced window. The amount |w(x)| is the number of displacements in the window or the number of summands for the total formula. To achieve sufficient numerical stability, |w(x)| should be selected sufficiently large, for example, |w(x)| can correspond to approximately half of the buffer size. If the sum shown above exceeds a given threshold value, a tag INVALID is added to the metadata Mnk. If the sum remains below the threshold value, the tag VALID is added to the metadata.

This is to be briefly explained based on a very simple example. However, it must be pointed out that this example would not work in reality for the actual processing of television image signals due to the lack of hash information and due to missing robustness of d. The example here is meant to merely improve the understanding for the applied function above.

It is assumed that the hash value is one-dimensional, and that d in the above formula is the amount difference between HR1 and Hnk. Furthermore, it is assumed that the displacement is made from the left into the buffer; thus, the oldest image with the lowest index is right. The amount |w(x)| is assumed as minimum 3, so that x=−1, 0 and +1 are possible.

In the example, three cameras (n=1 to 3) are assumed. The following buffer situation is viewed:

| | HR1 | | | |
|---|---|---|---|---|
| | l = 4 | l = 3 | l = 2 | l = 1 |
| PR | 9 | 3 | 2 | 8 |
| | Hnk | | | |
| | k = 4 | k = 3 | k = 2 | k = 1 |
| P1 (n = 1) | 9 | 9 | 8 | 9 |
| P2 (n = 2) | 7 | 9 | 3 | 3 |
| P3 (n = 3) | 1 | 4 | 5 | 6 |

Without setting forth the entire calculation here, it is pointed out that the pair (n,x), which represents the best solution regarding the above function, is (n=2, x=1). This means that camera 2 is visible (i.e. the camera image from camera 2 is used as the production image), and that the indices l and k are related as follows: k=l-1. The above-mentioned sum extends across w(x=1)={2, 3, 4} or, in line with this, k in {1, 2, 3}. In this process, the respective hash values correspond to each other except for PR(l=2) and P2(k=1) with d=1.

Figure 4:
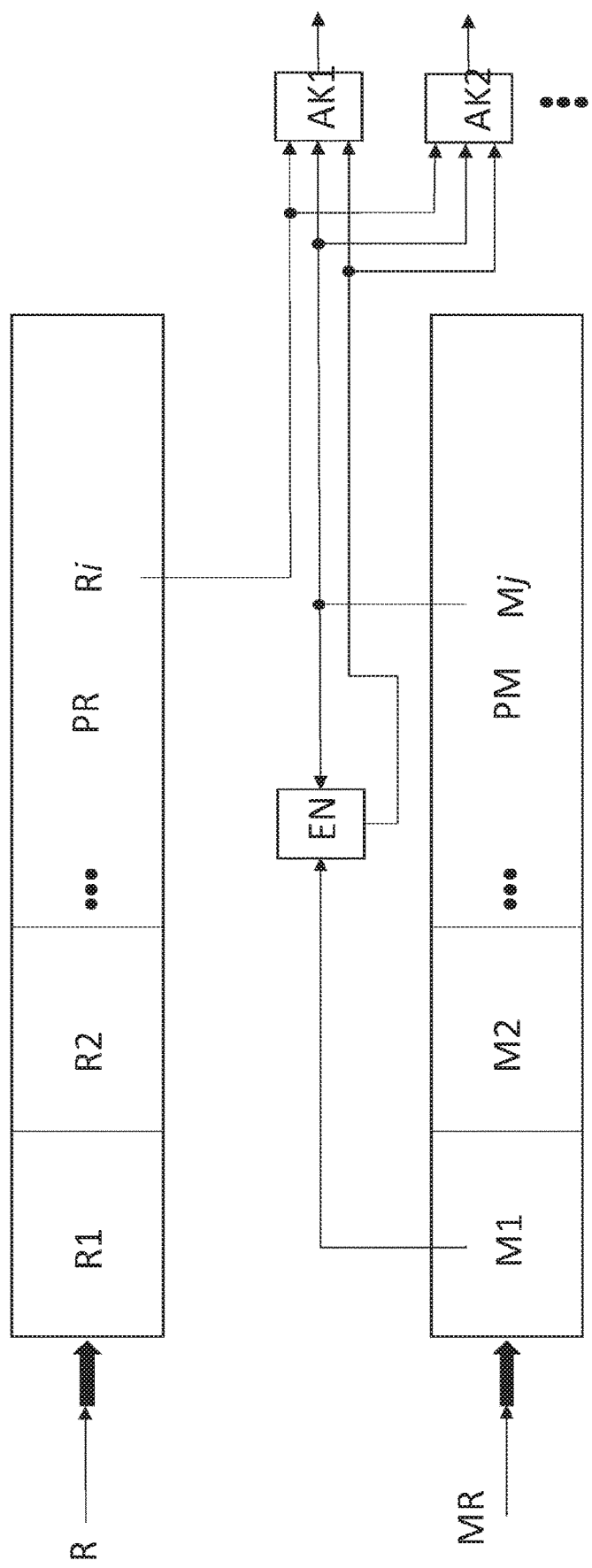

FIG. 4 schematically shows the multiplication module 16 and the associated process. Input variables (input) are the production image metadata MR to the production image or production signal and the production image or production signal R itself, with these input variables being synchronously buffered. The production image metadata MR are provided by the synchronization module 14 (S4 in FIG. 1). The multiplication module outputs production images or production signals with different augmentations as signal S5, which is then actually broadcast. This augmented production image or production signal is output synchronously buffered.

The multiplication module 16 includes augmentation components AK1, AK2 to AKn, which is indicated by the three dots below AK2. The augmentation components AK1, AK2 use the metadata Mj, a state Z(t), as well as animations and augmentations specified by the control module 18 to individually superimpose the production image or production signal.

A constant time offset (i-j) between the provided production image metadata MR and the production images R, which is caused by the synchronization module 14, is communicated to the multiplication module 16 via the control module 18. Based on this information, the time offset can be compensated for by the buffers PR and PM, so that the associated metadata can be correctly assigned to each production image.

In this process, the potential states for Z(t) can be described by two variables EN and TR, with EN being a representation whether augmentations are switched on or switched off, and with TR being a representation whether a transition animation is to be played when switching between a switch-on state and a switch-off state.

The states are:

Z=1, with EN=1 and TR=0, and the augmentation component is to regularly augment according to metadata, i.e. the augmentations are switched on (switch-on state);

Z=2, with EN=0 and TR=0, and the augmentation component is to output original images without the fading in of augmentations, i.e. the augmentations are switched off (switch-off state);

Z=3, with EN=1 and TR=1, and the augmentation component is to play a transition animation starting from a switch-on state (Z=1) moving to a switch-off state (Z=2); and Z=4, with EN=0 and TR=1, and the augmentation component is to play a transition animation starting from a switch-off state (Z=2) moving to a switch-on state (Z=1).

Figure 5:
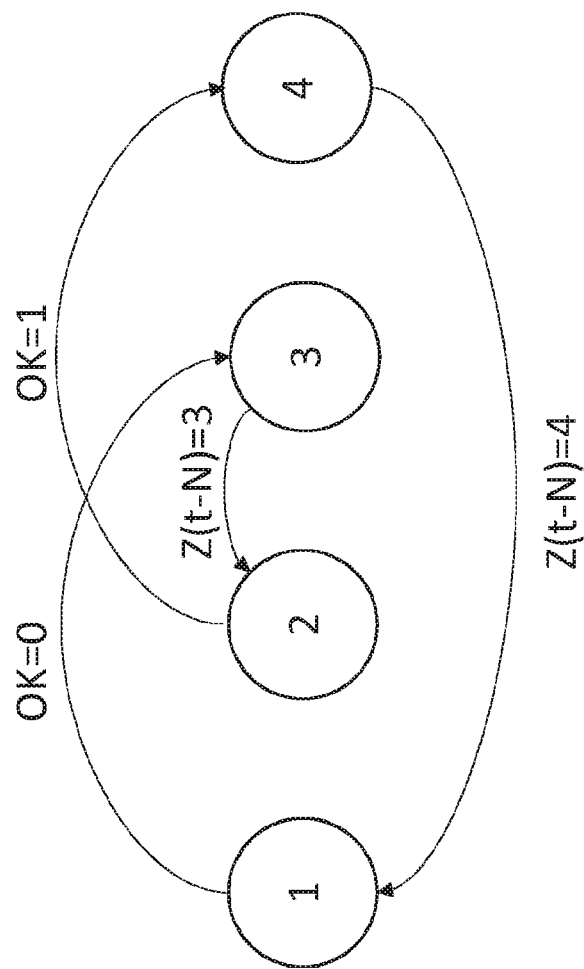
FIG. 5 shows states existing in the multiplication module.

The states Z(t)=1 to 4 and their transitions are shown in FIG. 5 in an exemplary manner as a diagram. In this process, switching off the display of augmentations is a transition lasting N cycles from Z=1 and OK=0 (data S2(t) are not suited for display) via Z=3 to Z=2. Switching on the display of augmentations is a transition lasting N cycles from Z=2 and OK=1 (data S2(t) are suited for display) via Z=4 to Z=1.

These state transitions allow the augmentation components AK1, AK2 not only to superimpose the current camera image (production image), but to specifically change it, so that it cannot be recognized when switching on the TV set whether currently reality or augmentation can be seen. Thus, effects such as "virtual rolling banners" (the reality is "rolled to and fro"), "virtual windows" (the reality is "flipped open") or the like can be achieved.

Figure 6:
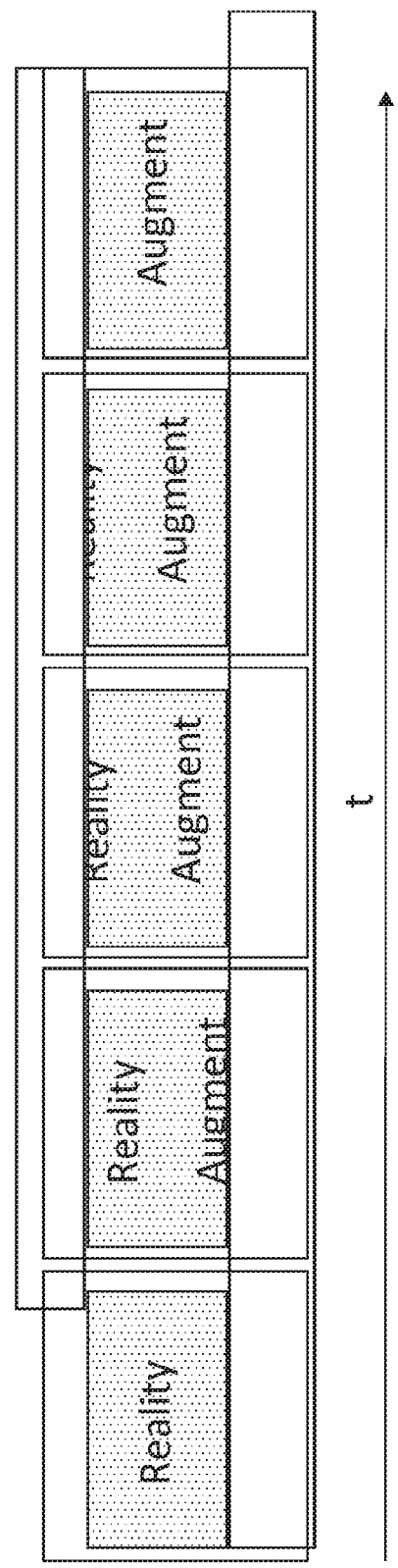
FIG. 6 shows an example of an augmentation inclusive of an associated animation sequence.

The example of a virtual rolling banner is briefly explained here based on FIG. 6. The first image (left) shows the state Z=2, the real image is broadcast as the production image. The images 2 to 4 (from left to right) show the transition state Z=4 where an animation is used to successively fade in the augmentation "augment" into the production image to be broadcast. The state Z=1 is achieved in the right image 5, in which the augmentation "augment" is permanently faded in into the production image to be broadcast. Naturally, such a virtual rolling banner can also be used for the transition from the state Z=1 to the state Z=2 with the transition state Z=3 if the augmentation is to be disabled.

With regard to playing animations and a system configured for this purpose, reference is made to the application entitled "System for producing augmented images" filed by the same applicant on the same day. The system described therein with its different modules is completely incorporated herein by reference for the above explanations regarding FIGS. 4 to 6. In particular, the multiplication module 16 and the control module 18 described herein can take over corresponding functions of the modules described in the aforementioned parallel patent application. In the referenced patent application, reference is specifically made to all embodiments in the figure description, which also has relevance for the present application and the content of disclosure of which can also be taken into account for a concretization of features of the present application.

The control module 18 illustrated in FIG. 1 takes over the central control of all other modules, namely analysis modules A1, A2, synchronization module 14 and multiplication module 16. The control module 18 itself is controlled by the production unit 12. The production can thereby disable the augmentation system at any time (Z=1 to Z=3 and then Z=2) and enable it (Z=2 to Z=4 and then Z=1), wherein the disablement or enablement is achieved by means of state Z(t) of the multiplication module 16.

The control module 18 can optionally be coupled to one or more arbitrary input videos, such as the LED system 20 indicated in FIG. 1, from an additional camera or from a video storage system. The control module 18 can pass on this additional data stream from the multiplication module 16 to the augmentation components A1, A2, so that, for example, augmentation can be done with virtual live videos. This enables, for example, virtual screens.

As already mentioned, the image, which is currently displayed by the LEDs, can, as an optional expansion at a monitor output of the LED system 20, be recorded with one or more image signals. The LED system can be radiometrically or geometrically calibrated with the aid of a calibration animation, which is recorded by each camera. A function of representation f:x→y can thereby be determined, which is to be displayed on the LEDs for a specific color value x in the original image, and can predict a specific color value y in the camera image recorded by it. This enables that the analysis modules A1, A2 can precisely determine occlusions as the background or the color value to be expected at the respective location of the image is known at any time.

With regard to the incorporation of an LED system and related possibilities for the enhanced segmentation of foreground objects and background objects, reference is made to the application entitled "System for dynamically maximizing the contrast between the foreground and background in images and/or image sequences" filed by the same applicant on the same day. The system described therein and corresponding method steps can be integrated into the television broadcast system presented herein, in particular, the control module K described therein can be contained in the system described herein in control module 18. The display device described therein can be contained in the LED system 20 described herein. From the review of FIG. 1 therein and FIG. 1 of the present application it can be seen that the system of the parallel application can easily be incorporated into the television broadcast system. Accordingly, complete reference is made to the parallel application entitled "System for dynamically maximizing the contrast between the foreground and background in images and/or image sequences" and all features described therein can also be incorporated into the television system presented herein, in particular, the database for display information (video clips) as well as corresponding network connections. Furthermore, the analysis modules described herein can naturally also calculate and minimize the energy function described in the parallel application.

The television broadcast system presented herein enables the change of real image contents virtually in real time, in particular, during a period in which the different camera signals are edited in the production unit to the production signal to be broadcast. The analyses purely based on image recognition for the determination of metadata are chosen in such a manner that the time customary in such broadcast systems is hardly delayed. Typical fields of use for such a system can, for example, be sports broadcasts in different countries, wherein it is determined in advance for each country, which advertising in the form of augmentations is to be made available and is then to be faded in accordingly. If, for example, a banner advert of the organizing country is shown in reality, a country-specific advertising can be faded in as augmentation by means of augmentations for each country into which the event is transmitted. In this process, a smooth transition between reality and virtual augmentation is enabled due to the transition states (Z=3 or 4) in the multiplication module, so that a television viewer cannot distinguish, whether they see the real advert which is also visible at the location of the event, or whether they see a specific advert or augmentation faded in. As already mentioned at the beginning, the presented television broadcast system does not require additional sensors, which determine any positions, distances or the like. The functional principle is purely based on image analysis in real time from each camera image, which a camera has recorded.

The invention claimed is:

1. A television broadcast system, comprising:
a plurality of television cameras configured to record camera images and output the camera images as camera signals, or at least one storage medium configured to store the camera images previously recorded by the plurality of television cameras and to output the stored camera images as camera signals;
at least one production unit configured to generate a sequence of production images from the camera images of the plurality of television cameras and output the sequence of production images as production signals;
a plurality of analysis modules, wherein an analysis module of the plurality of analysis modules is assigned to each television camera of the plurality of television cameras, wherein the plurality of analysis modules is configured to receive the camera images synchronously buffered, analyze each individual camera image, calculate camera image metadata and an associated camera image hash value for each camera image, and asynchronously output the camera image metadata and the camera image hash value for each camera image;
a synchronization module connected to the at least one production unit and to the plurality of analysis modules and configured to receive the production images from the at least one production unit synchronously buffered and calculate, for each production image, an associated production image hash value, and receive, for each camera image, the camera image metadata and the associated camera image hash value from the plurality of analysis modules asynchronously buffered, wherein the synchronization module is further configured to compare production image hash values and camera image hash values, and assign, based on the comparison, the associated camera image metadata of a camera image to a current production image as production image metadata, and output the production image metadata synchronously buffered;
a multiplication module connected to the synchronization module and to the at least one production unit and configured to receive the production image metadata from the synchronization module synchronously buffered and receive the production images from the at least one production unit synchronously buffered, wherein the multiplication module is further configured to compensate for a time offset between a production image and the associated production image metadata, and wherein the multiplication module is further configured to generate, based on the production image metadata, a change in the production image of at least one subsection of the production image by an augmentation, so that an augmented production image is generated, and output the augmented production image.

2. The television broadcast system of claim 1, further comprising:
a control module connected to the at least one production unit, to the plurality of analysis modules, to the synchronization module and to the multiplication module, wherein the control module is configured to enable or disable the plurality of analysis modules, the synchronization module and the multiplication module based on a control signal transmitted from the at least one production unit to the control module.

3. The television broadcast system of claim 2, wherein the control module is further configured to monitor or control the time offset between a production image and the associated production image metadata, and send the time offset to the multiplication module.

4. The television broadcast system of claim 3, wherein the control module is further configured to store at least one given animation sequence and send the at least one given animation sequence to the multiplication module.

5. The television broadcast system of claim 4, wherein the multiplication module is further configured to transmit, in a first state, the augmented production image, transmit, in a second state, the production image, perform, in a third state, a transition from the second state to the first state by an animation sequence, and perform, in a fourth state, a transition from the first state to the second state by an animation sequence.

6. The television broadcast system of claim 5, wherein the multiplication module has at least one augmentation component configured to generate the augmented production image based on: the first to fourth states; the production image metadata; the augmentation transmitted by the control module; and the animation sequence transmitted by the control module.

7. The television broadcast system of claim 2, wherein the control module is further configured to store at least one given augmentation and transmit the at least one given augmentation to the multiplication module.

8. The television broadcast system of claim 7, wherein the control module is further configured to store at least one given animation sequence and send the at least one given animation sequence to the multiplication module.

9. The television broadcast system of claim 8, wherein the multiplication module is further configured to transmit, in a first state, the augmented production image, transmit, in a second state, the production image, perform, in a third state, a transition from the second state to the first state by an animation sequence, and perform, in a fourth state, a transition from the first state to the second state by an animation sequence.

10. The television broadcast system of claim 9, wherein the multiplication module has at least one augmentation component configured to generate the augmented production image based on: the first to fourth states; the production image metadata; the augmentation transmitted by the control module; and the animation sequence transmitted by the control module.

11. The television broadcast system of claim 2, wherein the control module comprises at least one further data input configured to receive additional data from a further camera and/or from a screen system, and/or from a video storage system, wherein the control module is configured to transmit the additional data to the multiplication module, and wherein the multiplication module is further configured to take into account the additional data for the generation of the augmented production image.

12. The television broadcast system of claim 1, further comprising:
an electronic banner system having an image signal output,
wherein the electronic banner system is connected to a plurality of banner monitors and configured to display and/or animate banner images on the plurality of banner monitors,
wherein the banner system is connected to the control module and configured to transmit a banner image signal for the plurality of banner monitors to the control module.

13. The television broadcast system of claim 12, wherein the plurality of analysis modules is configured to determine occlusions of a banner monitor of the plurality of banner monitors based on a comparison between the banner image signals and a camera image.

14. The television broadcast system of claim 1, wherein the multiplication module is configured to provide an augmented production image where an augmentation or superimposition in a specific image section is orthogonally projected for each camera setting.

15. The television broadcast system of claim 1, wherein the multiplication unit is configured to provide, in an augmented production image, a partial change or superimposition of a recorded transparent object such that an augmentation and/or an animation is visible on the transparent object in the augmented production image.

16. The television broadcast system of claim 1, wherein the multiplication module is configured to generate a plurality of diversely augmented production images and output the plurality of diversely augmented production images synchronously to different outputs.

17. A method for augmenting images of a television broadcast or television recording, the method comprising:
recording camera images by a plurality of television cameras, and outputting the camera images as camera signals;
generating a sequence of production images generated from a selection from the camera images of the plurality of television cameras, and outputting the production images as production image signals;
synchronously buffered receiving of the camera images of the plurality of television cameras in a respective analysis module, wherein each camera image is analyzed and camera image metadata are generated for each camera image and a camera image hash value is calculated, and wherein the camera image metadata and the camera image hash value are asynchronously output from the respective analysis module;
synchronously buffered receiving of the production images in a synchronization module, calculating a production image hash value for each production image, and synchronously buffered receiving of the camera image metadata and of the associated camera image hash value for each camera image, wherein the production image hash values and camera image hash values are compared and, based on the comparison, the associated camera image metadata of a camera image are assigned to a current production image as production image metadata, and the production image metadata are output synchronously buffered;
synchronously buffered receiving of the production image metadata and of the production images in a multiplication module, compensating a time offset between a production image and the associated production image metadata in the multiplication module, and generating a superimposition in at least one subsection of the production image with an augmentation based on the production image metadata, so that an augmented production image is generated, and outputting the augmented production image.

18. A television broadcast system, comprising:
a plurality of television cameras configured to record camera images and output the camera images as camera signals, or at least one storage medium configured to store the camera images previously recorded by the plurality of television cameras and output the stored camera images as camera signals;
at least one production unit configured to generate a sequence of production images from the camera images of the plurality of television cameras and output the sequence of production images as production signals;
a plurality of analysis modules, wherein an analysis module of the plurality of analysis modules is assigned to each television camera of the plurality of television cameras, wherein the plurality of analysis modules is configured to receive the camera images synchronously buffered, and wherein the plurality of analysis modules is configured to analyze each individual camera image, calculate camera image metadata and an associated camera image hash value for each camera image, and asynchronously output the camera image metadata and the camera image hash value for each camera image;
a synchronization module connected to the production unit and to the plurality of analysis modules and configured to receive the production images from the at least one production unit synchronously buffered and calculate, for each production image, an associated production image hash value, and receive, for each camera image, the camera image metadata and the associated camera image hash value from the plurality of analysis modules asynchronously buffered, wherein the synchronization module is further configured to compare production image hash values and camera image hash values, and assign, based on the comparison, the associated camera image metadata of a camera image to a current production image as production image metadata, and output the production image metadata synchronously buffered;
a multiplication module connected to the synchronization module and to the at least one production unit and configured to receive the production image metadata from the synchronization module synchronously buffered and receive the production images from the at least one production unit synchronously buffered, wherein the multiplication module is further configured to compensate for a time offset between a production image and the associated production image metadata, and wherein the multiplication module is further configured to generate, based on the production image metadata, a change in the production image of at least one subsection of the production image by an augmentation, so that an augmented production image is generated, and output the augmented production image, wherein the multiplication module is further configured to transmit, in a first state, the augmented production image, transmit, in a second state, the production image, perform, in a third state, a transition from the second state to the first state by an animation sequence, and perform, in a fourth state, a transition from the first state to the second state by an animation sequence.

* * * * *